(12) United States Patent
Kumar

(10) Patent No.: US 10,671,244 B2
(45) Date of Patent: Jun. 2, 2020

(54) ORDERING CATEGORIES IN AN ELECTRONIC USER INTERFACE MENU BASED ON USER INTERACTION FREQUENCY

(71) Applicant: Home Depot Product Authority, LLC, Atlanta, GA (US)

(72) Inventor: Toshivv C. Kumar, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 57 days.

(21) Appl. No.: 15/487,679

(22) Filed: Apr. 14, 2017

(65) Prior Publication Data
US 2018/0300022 A1 Oct. 18, 2018

(51) Int. Cl.
G06F 3/0482 (2013.01)
G06F 16/9535 (2019.01)

(52) U.S. Cl.
CPC ........ *G06F 3/0482* (2013.01); *G06F 16/9535* (2019.01)

(58) Field of Classification Search
CPC .......................... G06F 3/0482; G06F 17/30869
See application file for complete search history.

(56) References Cited

U.S. PATENT DOCUMENTS

| | | | | |
|---|---|---|---|---|
| 5,060,135 A * | 10/1991 | Levine | ................ | G06F 3/04817 715/769 |
| 6,167,439 A * | 12/2000 | Levine | ................ | G06F 3/04817 358/408 |
| 9,423,933 B2 * | 8/2016 | Kim | .................... | G06F 3/04883 |
| 10,168,862 B2 * | 1/2019 | Yenigalla | ............. | H04N 21/482 |
| 2001/0019338 A1 * | 9/2001 | Roth | .................... | G06F 3/0482 715/811 |
| 2002/0085017 A1 * | 7/2002 | Pisutha-Arnond | .... | G06F 3/0482 345/660 |

(Continued)

FOREIGN PATENT DOCUMENTS

WO 2014201546 A1 12/2014

OTHER PUBLICATIONS

ISR and WO issued re international application No. PCT/US2018/025800, dated Jun. 20, 2018, 10 pgs.

(Continued)

*Primary Examiner* — Phenuel S Salomon
(74) *Attorney, Agent, or Firm* — Greenberg Traurig, LLP

(57) ABSTRACT

A system and method for displaying a user interface may include an examination and/or elimination of positional bias of interactive categories in order to drive user engagement. A method or system configured to execute the method on a user interface may include creating a first arrangement of categories. The arrangement can be shown on a user device to one or more users a selected number of times. The users' interactions with the categories in the interface may be recorded. The method may further include creating a second arrangement, which is different from the first arrangement, and this second arrangement may be shown to the users the selected number of times and the users' interactions with the second arrangement may be recorded. Based on the frequency of user interactions with the first and second arrangement, a ranked set of the categories may be created and displayed to users.

18 Claims, 8 Drawing Sheets

(56) References Cited

U.S. PATENT DOCUMENTS

| | | | |
|---|---|---|---|
| 2004/0015500 A1* | 1/2004 | Pugliese | G06F 3/0482 |
| 2004/0100505 A1* | 5/2004 | Cazier | G06F 3/0482 |
| | | | 715/811 |
| 2004/0130578 A1* | 7/2004 | Charney | G06F 3/0482 |
| | | | 715/810 |
| 2005/0003868 A1 | 1/2005 | Oh | |
| 2006/0143574 A1* | 6/2006 | Ito | G06F 3/04817 |
| | | | 715/800 |
| 2006/0224558 A1* | 10/2006 | Flora | G06F 17/30554 |
| 2008/0134086 A1* | 6/2008 | Liao | G06F 3/0482 |
| | | | 715/810 |
| 2009/0138821 A1* | 5/2009 | Shinokura | G06F 3/0482 |
| | | | 715/810 |
| 2009/0315867 A1* | 12/2009 | Sakamoto | G06F 3/03547 |
| | | | 345/184 |
| 2010/0070926 A1* | 3/2010 | Abanami | G06F 1/1626 |
| | | | 715/835 |
| 2010/0115457 A1* | 5/2010 | Bombolowsky | G06F 3/0481 |
| | | | 715/782 |
| 2010/0131845 A1* | 5/2010 | Pann | G11B 27/105 |
| | | | 715/716 |
| 2011/0029929 A1* | 2/2011 | Clauson | G06F 3/0482 |
| | | | 715/843 |
| 2011/0296351 A1* | 12/2011 | Ewing, Jr. | G06F 3/0346 |
| | | | 715/841 |
| 2012/0023455 A1* | 1/2012 | Chen | G06F 16/248 |
| | | | 715/853 |
| 2013/0132857 A1* | 5/2013 | Shapiro | H04L 63/1483 |
| | | | 715/744 |
| 2013/0169840 A1* | 7/2013 | Han | G06F 16/58 |
| | | | 348/231.99 |
| 2014/0082554 A1* | 3/2014 | Iwaniszczuk | G06F 3/0483 |
| | | | 715/823 |
| 2017/0060505 A1* | 3/2017 | Tamashima | G06F 3/1258 |
| 2017/0102839 A1* | 4/2017 | Nadella | G06F 3/0482 |
| 2018/0052530 A1* | 2/2018 | Fischer | G06F 3/038 |

OTHER PUBLICATIONS

Sears et al., "Split menus: effectively using selection frequency to organize menus." In: ACM Transactions on Computer-Human Interaction (TOCHI)., Jun. 7, 1993, 22 pgs.

* cited by examiner

ORDERING CATEGORIES IN AN ELECTRONIC USER INTERFACE MENU BASED ON USER INTERACTION FREQUENCY

FIELD OF THE DISCLOSURE

The present disclosure relates to the ordering of menu categories on an electronic user interface, such as categories of filters for searching or sorting a set of items on a webpage.

BACKGROUND

Many electronic user interfaces provide filters, which may be arranged in categories, to enable a user to search through or sort a list of items. For example, many websites and applications, such as e-commerce websites and applications, provide filters for searching and sorting a set of items for sale. Such filters may be arranged in categories directed to price range, manufacturer, features, and the like. Multiple categories may be provided in menus of the interface. For example, many e-commerce websites and applications provide toolbars on the top and/or left portion of the interface that include such filter menus.

SUMMARY

An embodiment of a method for displaying a user interface, wherein the user interface comprises a menu and the menu comprises a plurality of categories, may include creating a first arrangement for the plurality of categories within the menu. The method may further include causing the user interface to display the first arrangement for the plurality of categories to one or more users a selected number of times, with the plurality of categories arranged in the first arrangement, and creating a second arrangement for the plurality of categories within the menu, the second arrangement being different from the first arrangement. The method may further include causing the user interface to display to one or more users the selected number of times with the plurality of categories arranged in the second arrangement and recording user selections of the plurality of categories through the user interface in both the first arrangement and the second arrangement. The method may further include creating a third arrangement for the plurality of categories within the menu according to relative frequencies of user selections of the plurality of categories in the recorded user selections and causing the user interface to display with the plurality of categories arranged in the third arrangement.

An embodiment of a system for displaying a user interface may include a computer-readable memory storing instructions and a processor. The user interface comprises a menu and the menu comprises a plurality of categories. The processor may be configured to create a first arrangement for the plurality of categories within the menu and cause the user interface to display the first arrangement for the plurality of categories to one or more users a selected number of times with the plurality of categories arranged in the first arrangement. The processor may also be configured to create a second arrangement for the plurality of categories within the menu, the second arrangement different from the first arrangement and cause the user interface to display to one or more users the selected number of times with the plurality of categories arranged in the second arrangement. The processor may also be configured to record user selections of the plurality of categories through the user interface in both the first arrangement and the second arrangement and create a third arrangement for the plurality of categories within the menu according to relative frequencies of user selections of the plurality of categories in the recorded user selections. The processor may also be configured to cause the user interface to display with the plurality of categories arranged in the third arrangement.

An embodiment for a method for displaying a user interface, wherein the user interface comprises a menu and the menu comprises a plurality of categories, may include creating N different arrangements for a plurality of categories within the menu wherein each arrangement comprises a first position, a bottom position, and ordered intermediate positions. In each arrangement, each category in the plurality of categories occupies each of the first position, bottom position, and each of the ordered intermediate positions once among the N arrangements. The method may further include causing the user interface to display to one or more users the selected number of times with the plurality of categories arranged in the given arrangement and, for each given one of the N arrangements, recording user selections of the plurality of categories through the user interface in the N arrangements on the computer-readable memory. The method may further include creating an N+1 arrangement for the plurality of categories within the menu according to relative frequencies of user selections of the plurality of categories in the recorded user selections and causing the user interface to display with the plurality of categories arranged in the N+1 arrangement.

DETAILED DESCRIPTION

The instant disclosure will describe a system and methods for providing a user interface and, more specifically, for arranging categories within a menu of such an interface, such as categories of filters in a product listing or search results page that may be used to sort and filter the products or other items listed on the page. Categories of filters may have at least two respective user options. Known methods of arranging filter categories generally do not arrange the categories so as to place the most popular filters at the top (so as to drive more user engagement and, in the case of e-commerce interfaces, more sales). The known methods that do order filters in an attempt to drive user engagement generally do not properly determine the most popular filters because they do not account for or eliminate inherent bias in the initial presentation of the filter categories. In embodiments, the system and methods of the instant disclosure improve upon known methods by reducing such bias, as will be described in greater detail below.

Bias based on the position of a filter may occur for a variety of reasons. First, in many instances, a limited number of categories—i.e., less than the entire set of categories—might be shown to a user by default. Naturally, the user will be less likely to engage with filter categories that are not shown by default. For example, if a user must scroll down or go looking in a "more filters" menu to find a particular filter category, they are less likely to interact with that filter category. Second, in some cases, adjacent and nearby filter categories may influence the user's perceived utility of a particular filter category. The user may perceive that two filters are redundant or that the latter is superfluous in view of the first. These biases may affect user interaction with filter categories, which in turn may result in an incorrect or biased understanding of which filter categories are truly most preferred by or useful to users. Thus, eliminating bias resulting from the initial placement of filter categories when measuring the popularity of those filter categories can improve the popularity measurement.

The instant application will be described with reference to "categories" of filters. Such categories may include what are known in the retail industry as "attributes"—i.e., attributes of the underlying products. As used herein, however, "category" may also include other types of information, especially when the teachings of the instant disclosure are applied in a non-retail context.

Figure 1:
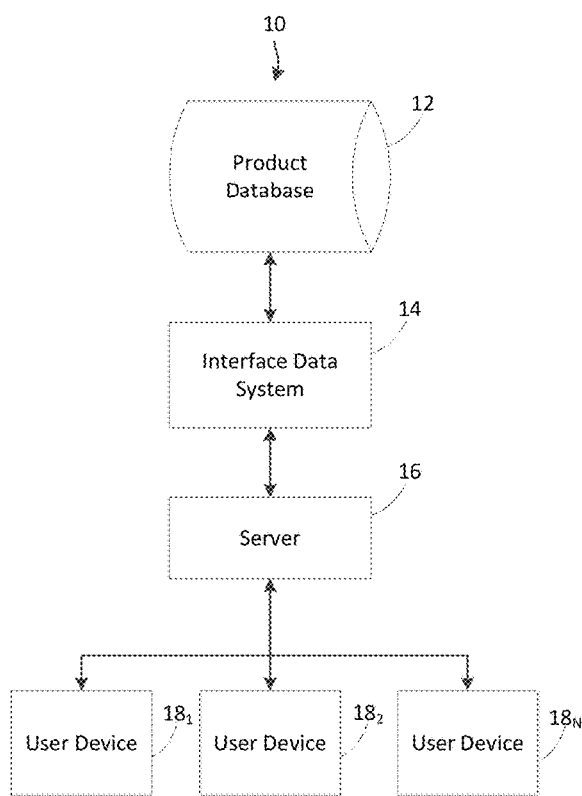
FIG. 1 is a diagrammatic view of an example system for providing a user interface to one or more users, such as a user interface having a plurality of filter categories arranged in a menu.

Reference will now be made in detail to embodiments of the invention, examples of which are illustrated in the accompanying drawings. FIG. 1 is a diagrammatic view of an example system for providing a user interface to one or more users, such as a user interface having a plurality of filter categories arranged in a menu (example user interfaces, menus, and categories are shown in and will be described in greater detail later in this disclosure with reference to FIGS. 7 and 8). The system 10 may include a product database 12, an interface data system 14, a server 16, and a plurality of user devices $18_1$, $18_2$, . . . , $18_N$ (which may be referred to individually as a user device 18 or collectively as user devices 18).

In general, the server 16, interface data system 14, and product database 12 may collectively provide one or more user interfaces to the user devices 18. For example, the server 16 may host a website, a mobile app, an in-store checkout environment, an in-store kiosk, or some other user interface. Portions of this disclosure will be described with reference to embodiments in which the user interface is provided on a website. It should be understood that such disclosure is by way of example only.

The server 16 may be in electronic communication with the user devices 18 to provide a user interface to the user devices 18 and to receive user commands input through the user devices 18. For example, the server 16 may serve a website, a mobile application, etc., that may provide or be accessed via the user interface on the user devices 18. The server 16 may also be in electronic communication with the interface data system 14, which may provide data that may be used by the server 16 to populate a user interface for display on the user devices 18. Such data may include, for example, the contents and arrangement of elements in one or more menus of the interface, information for product information pages displayed in the interface, products to be listed in a search results page within the interface, and other information that may be found in a user interface. In addition, the interface data system 14 may receive and store data from the server 16 regarding user interactions with the user interface.

The interface data system 14 may be in electronic communication with the product database 12. The product database 12 may store information regarding a plurality of products, in embodiments. In some embodiments, such information may include categorical information as well other metadata associated with individual products and inventory thereof, such as features, prices, sizes, trim levels, locations, and stock or inventory levels. In an embodiment, the product database 12 may store information respective of a plurality of products offered for sale by a retailer. The interface data system 14 may retrieve product information from the product database 12 for provision to a user through a user interface provided by the server 16, in an embodiment.

The interface data system 14 may be configured to perform one or more steps, methods, or techniques of this disclosure. That is, the interface data system may include a computer-readable memory storing instructions, and a processor executing those instructions to perform such steps, methods, or techniques. The processor may be configured to execute the instructions further to present a set of items in the interface according to user engagement of the filters. In an embodiment, the functionality of the interface data system 14 described herein may be performed by a single piece of computing hardware. In other embodiments, the functionality of the interface data system 14 described herein may be performed by two or more pieces of computing hardware. In an embodiment, some or all of the functionality described herein with respect to the interface data system may be performed by the server.

Figure 2:
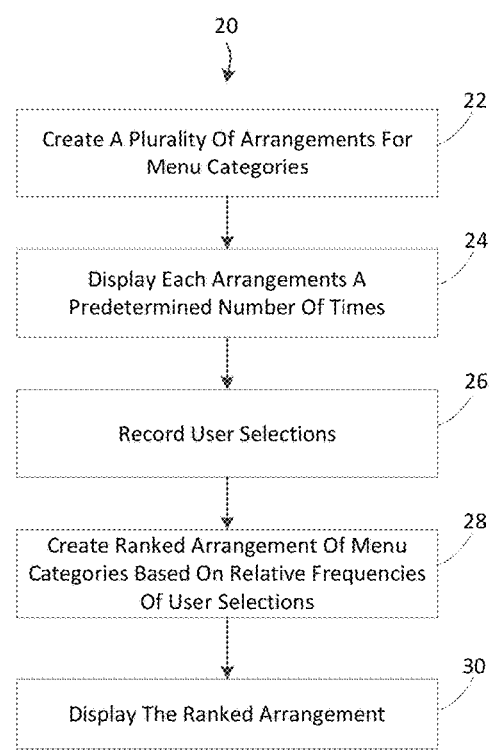
FIG. 2 is a flow chart illustrating an example method of displaying filter categories in a user interface.

FIG. 2 is a flowchart illustrating an example method 20 of displaying filter categories in a user interface. Some or all of the steps of the method 20 may be performed by the interface data system 14, the server 16, or some other hardware or system. The method 20 will be described with respect to the system 10 of FIG. 1, but it should be understood that such description is by way of example only.

The method 20 may begin at a creating step 22, in which the interface data system 14 may create a plurality of arrangements for a set of menu categories. The menu categories may be, for example, a plurality of categories within the menu, each category having a plurality of filters, of a user interface to be provided by the server 16. In an example embodiment in which the user interface is in an e-commerce website, the filter categories may include, e.g., manufacturer, price, product features, and the like. Each of the arrangements may be different from each other arrangement, in an embodiment. The number of arrangements may be equal to the number of categories, in an embodiment. Each arrangement may include an order of categories, in an embodiment. Further, in an embodiment, the plurality of arrangements may include every possible position in the order for each of the plurality of filters.

The method 20 may further include a displaying step 24 in which the server 16 may display the categories arranged in each of the arrangements a predetermined number of times (i.e., may provide each arrangement for a selected or predetermined number of user interface users, user interface visitors, or some other metric). As will be described with respect to the methods of FIGS. 4 and 5, in embodiments of the displaying step 24, the server 16 may first provide a first arrangement the predetermined or selected number of times, then a second arrangement for the predetermined or selected number of times, and so on. In an embodiment in which the filter categories are provided on a website, each arrangement could be displayed for a predetermined or selected number of user views of the website. The predetermined number may be, for example only, ten thousand, in an embodiment. In embodiments, any suitable predetermined number of user views may be used.

The method may further include a recording step 26 in which the server 16 may track (i.e., receive and record) user interactions or selections with the categories including, for example, which categories are selected by users, how frequently, and in what combinations, among other information. In an embodiment, tracking user interactions may include recording the user selections or the number of times each menu category is selected within each arrangement. In an embodiment, the displaying and recording steps 24, 26 may include displaying and recording each arrangement created in creating step 22 to understand user behavior (e.g., user engagement of) with respect to the filter categories in the arrangements.

Once all of the arrangements created at creating step 22 have been displayed to users the predetermined or selected number of times and the user interactions with each arrangement have been recorded, the method 20 may further include a step 28 in which the interface data system 14 may create a ranked arrangement of the categories according to or based on the relative frequencies of user selections of categories in the recorded user interactions. For example, in an embodiment, the most-selected category (i.e., the category engaged by users most often during the displaying and recording steps 24, 26) may be placed first in the ranked arrangement, the second-most-selected category may be placed second, and so on. The ranked arrangement of categories may be stored in the interface data system 14. Finally, the method 20 may include a second displaying step 30 in which the server 16 may display the ranked arrangement of categories going forward. That is, once the ranked arrangement of categories is determined, the server 16 may display the categories in the ranked order to users that access the user interface. In one example, where the categories are categories of filters, the server 16 may further display a set of items in the interface according to user engagement of the filters.

Figure 3:
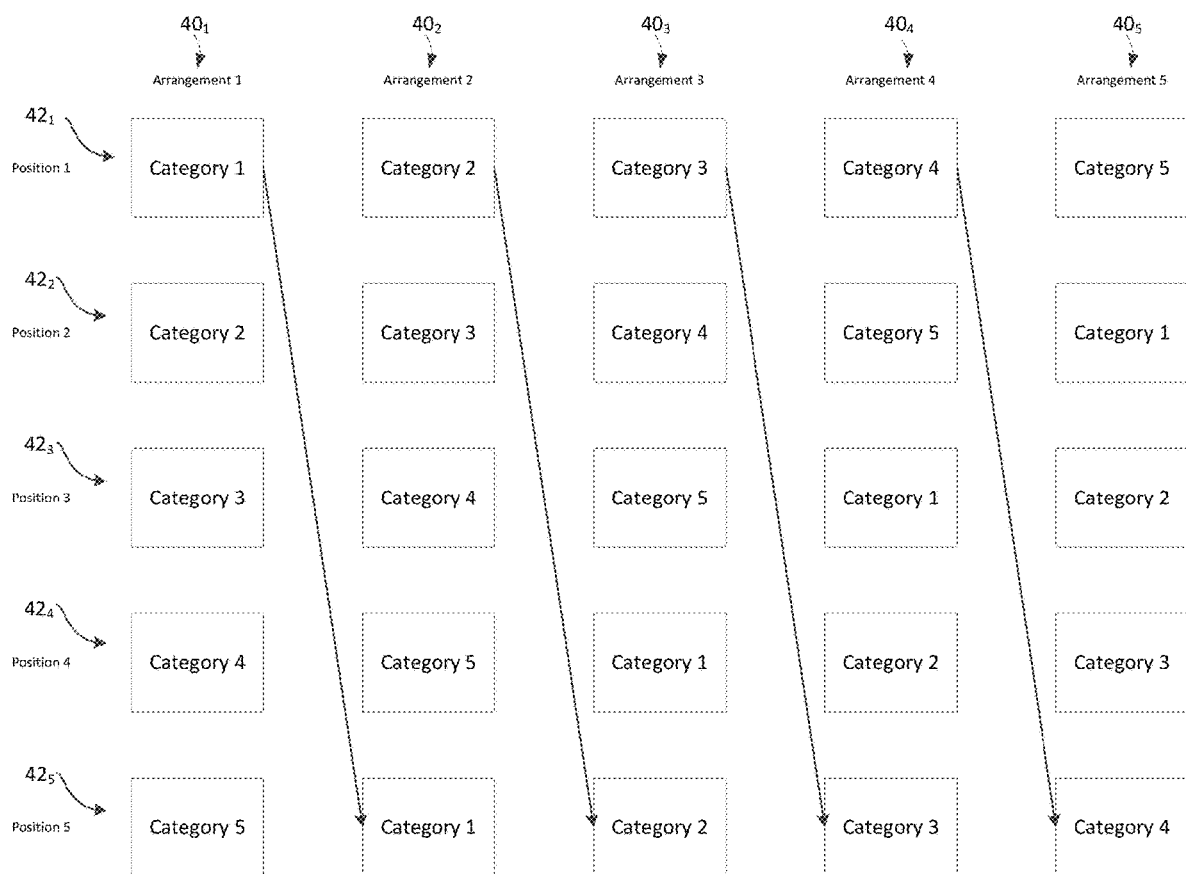
FIG. 3 is diagrammatic view of an example progression of filter category arrangements according to the method of FIG. 2.

FIG. 3 is a diagrammatic illustration of an example set of category arrangements that may be created in the creating step 22 and displayed at the displaying step 24 of the method 20 of FIG. 2. An example process for creating a plurality of arrangements of a plurality of categories will be described with respect to FIG. 3.

FIG. 3 illustrates five arrangements $40_1$, $40_2$, $40_3$, $40_4$, $40_5$ (each arrangement in its own column) of five categories (Category 1, Category 2, Category 3, Category 4, and Category 5). The arrangements $40_1$, $40_2$, $40_3$, $40_4$, $40_5$ may be referred to collectively as arrangements 40 or individually as an arrangement 40. Each arrangement 40 includes five positions $42_1$, $42_2$, $42_3$, $42_4$, $42_5$, including a first position $42_1$, ordered intermediate positions $42_2$, $42_3$, $42_4$, and a last position $42_5$. In an embodiment, the "first" position of an arrangement 40 may be the uppermost or left-most position, and the "last" or "end" position may be the lowest or right-most position. Each arrangement 40 is different from each other arrangement 40, such that each of the five categories occupies each position $42_1$, $42_2$, $42_3$, $42_4$, $42_5$ once among the five arrangements $40_1$, $40_2$, $40_3$, $40_4$, $40_5$. That is, among the five arrangements $40_1$, $40_2$, $40_3$, $40_4$, $40_5$, each category occupies the first position $42_1$, each of the ordered intermediate positions $42_2$, $42_3$, $42_4$, and the last position $42_5$ once. As noted above with respect to FIG. 2, the arrangements $40_1$, $40_2$, $40_3$, $40_4$, $40_5$ may be displayed in sequence to users, with each arrangement 40 shown a predetermined or selected number of times, in embodiments.

With continued reference to FIG. 3, to create the initial arrangement $40_1$ from a set of categories, each category may be placed into a random position in the arrangement $40_1$, in an embodiment. In other embodiments, the initial arrangement may be manually or automatically created to be a specific arrangement. For example, the initial arrangement may be the previous arrangement deployed on a website featuring the categories, in an embodiment.

In an embodiment, the second arrangement $40_2$ may be created by making alterations from the first arrangement $40_1$. For example, as illustrated in FIG. 3, in the first arrangement $40_1$, a first category (Category 1) is in the first position $42_1$, and is relocated to the end position $42_5$ in the second arrangement $40_2$. Because the example of FIG. 3 has five categories, the first category occupies the fifth position $42_5$ in the second arrangement $40_2$. Each of the other categories (in this example, Categories 2, 3, 4, and 5) are incremented one position upward, such that the second category is relocated to the first position $42_1$, the third category is relocated to the second position $42_2$, and so forth. It should be appreciated that this process is readily applicable to any number of arrangements, each including any number of categories.

The third, fourth, and fifth arrangements $40_3$, $40_4$, $40_5$ may be respectively similarly derived from the previous arrangement. That is, each successive arrangement 40 may differ from the previous arrangement 40 in that (1) the category occupying the first position $42_1$ in the previous arrangement 40 is relocated to the final position $42_5$ and (2) each other category is incremented one position upwards.

Figure 4:
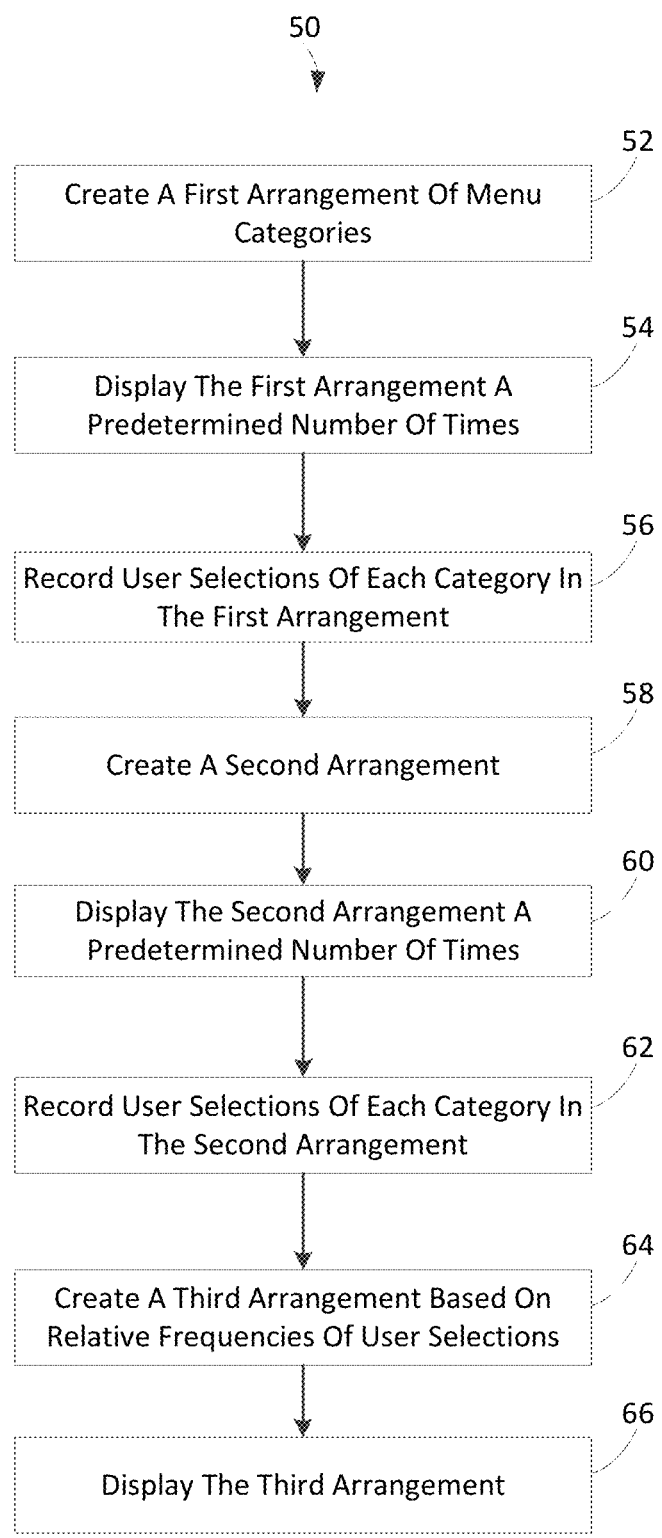
FIG. 4 is a flow chart illustrating an example method of displaying filter categories in a user interface.

FIG. 4 is a flow chart illustrating an example method 50 of creating and displaying menu category arrangements. The method 50 of FIG. 4 generally tracks the method 20 of FIG. 2, but will be described at a more granular level.

The method may include a first creating step 52 that includes creating a first arrangement of menu categories. The first arrangement of menu categories may be a randomized arrangement, or may be an intentionally-designed arrangement.

The method may further include a displaying step 54 that includes displaying the first arrangement in an electronic user interface a predetermined or selected number of times. For example, the first arrangement of menu categories may be displayed on a website for a predetermined number of user visits to the website, for a predetermined number of user interactions with the menu categories on the website, etc.

The method may further include a first recording step 56 that includes recording user selections of each category in the first arrangement. The recording step 56 may involve, for example, a server (e.g., the server 16 of FIG. 1) receiving a plurality of user selections of one or more (e.g., each) of the menu categories in the first arrangement and a server or other system (e.g., the server 16 or interface data system 14 of FIG. 1) storing records of those selections. For example, referring to FIG. 3, for example, in the first arrangement $40_1$, the recording step 56 may involve recording each time a user selects Category 1, each time a user selects Category 2, and so on. After displaying step 54 and recording step 56, a number of times that each category was selected by a user with the categories in the first arrangement may have been recorded.

The method 50 may further include a second creating step 58 that includes creating a second arrangement of the menu categories. The second arrangement may include the same menu categories as the first arrangement, but may be a different arrangement. That is, the second arrangement may be varied from the first so that at least some of the categories do not take the same position in the second arrangement as they occupied in the first arrangement. For example, referring again to FIG. 3, the second arrangement $40_2$ may differ from the first arrangement $40_1$ in that the category occupying the first or top position $42_1$ in the first arrangement $40_1$ may be placed in the last or last position $42_5$ in the second arrangement $40_2$ and each other category may be incremented up one position, in an embodiment. In other embodiments, the categories could also be shuffled or incremented differently. For example, rather than moving the first-position category to the end and incrementing upward, the last-position category may be moved to the first position and the other categories may be incremented downward, in an embodiment.

The method 50 may further include a second displaying step 60 that includes displaying the second arrangement in an electronic user interface a predetermined or selected number of times. Displaying the second arrangement at the second displaying step 60 may be similar to displaying the first arrangement at the first displaying step in an embodiment. The predetermined number of times may be the same number in the second displaying step 60 as in the first displaying step 54, in an embodiment.

The method may further include a second recording step 62 that includes recording user selections of each category in the second arrangement. Recording user selections at the second recording step may be substantially similar to recording user selections at the first recoding step 56, but with respect to the second arrangement of menu categories instead of the first arrangement.

The method 50 may further include a third creating step 64 that includes creating a third arrangement of the menu categories based on the relative frequencies of user selections of the menu categories in the first and second arrangements (i.e., as recorded at steps 56, 62). In an embodiment, the third arrangement may order the menu categories according to the relative frequencies with which those categories were selected by users in the first and second arrangements, with the most selected category placed in the first position, the second most selected category in the second position, the third most selected category in the third position, and so on as to form a ranked arrangement.

The method 50 may further include a third displaying step 66 that includes displaying the third arrangement in the electronic user interface. In an embodiment, the third arrangement may be displayed to users until, e.g., a new menu category ranking based on relative frequency of user interactions is desired.

It should be noted that, although the method is described in terms of tracking user selections of categories in two arrangements to create a ranked third arrangement, embodiments of the method 50 may include tracking user selections of categories for more than two arrangements. For example, in an embodiment, for a menu with ten categories, ten different arrangements may be created, and user selections of categories may be tracked for all ten arrangements to create a ranked eleventh arrangement.

More generally, the approach of the method 50 may be applied to a menu with any number N of categories (in the example of FIG. 3, N=5). In embodiments, N different arrangements may be created and displayed to users a predetermined or selected number of times. A ranked arrangement (i.e., arrangement N+1) may then be created based on tracking user selections of the categories in the N arrangements.

These arrangements have been described as a single-dimensional set of positions, such as a list, where each category is placed in a line before or after every other category. The methods of this disclosure could also be used on arrays and other structures to understand and eliminate positional bias. As such, the positions of an array could be incremented in the same way that the rotations stepped through each potential position of the categories shown in FIG. 3. Further, the results of the ranked ordering in the third arrangement resulting from the method 50 of FIG. 4 could be used populate an array or other structure.

Figure 5:
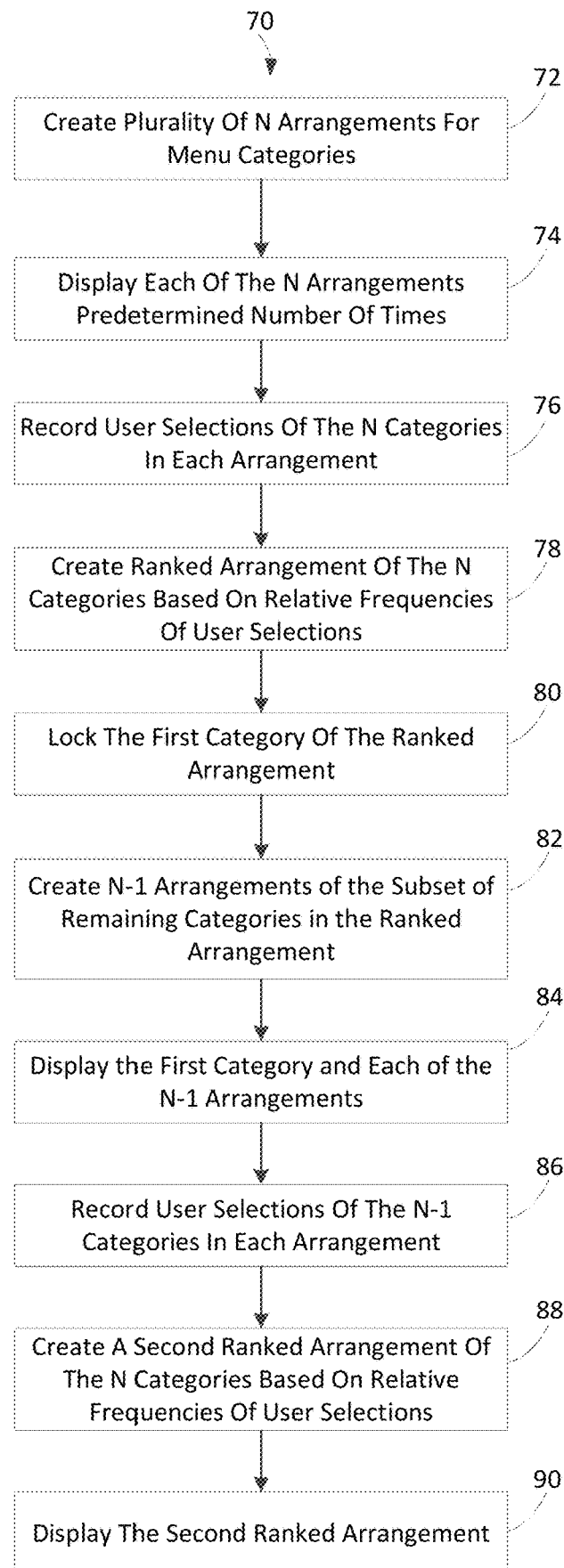
FIG. 5 is a flow chart illustrating an example method of displaying filter categories in a user interface.

The method 50 of FIG. 4 may be applied to a set of menu categories to reduce the inherent bias in the initial positioning of those menu categories in a determination of the most popular ones of those menu categories. FIG. 5 is a flow chart illustrating an example method 70 of determining the most popular of a set of menu categories given that a particular one or more of the menu categories will definitely be displayed. The method 70 may include a step 72 that includes creating a number N of arrangements for a set of menu categories. The method 70 will be described with reference to an embodiment in which the number N of arrangements is equal to the number of menu categories, and each category is included in each arrangement. As a result, in the example of FIG. 5, each of the N arrangements includes each of the N categories in a respective position. Accordingly, each of the N arrangements has N positions, in the example of FIG. 5. Furthermore, the method 70 will be described with reference to an embodiment in which each of the N categories occupies each of the N positions once among the N arrangements. However, one of ordinary skill will appreciate that many modifications may be made to the method 70, in other embodiments.

The method 70 may further include a displaying step 74 that includes displaying each of the N arrangements a predetermined or selected number of times. For example, each of the N arrangements may be displayed the predetermined or selected number of times on a webpage as an arrangement of filter categories that may be used to filter a set of items, such as a set of products.

The method may further include a recording step 76 that includes recording user selections of the N categories in each arrangement. The recording step may involve receiving user interactions with or selections of each of the categories and storing the records of these interactions or selections. For example, referring to FIG. 3, the recording step may involve recording each instance of a user selecting Category 1, recording each instance of a user selecting Category 2, and so on. After the recording step, the total interactions with each category may have been recorded for each arrangement.

The displaying and recording steps 74, 76 may be carried out iteratively, with one of the N arrangements displayed for the predetermined number of times, and user selections recorded for that arrangement, then another of the N arrangements displayed for the predetermined number of times, and user selections recorded for that arrangement, and so on, until every one of the N arrangements has been shown and the user's interactions the categories in each arrangement has been recorded.

The method 70 may further include a second creating step 78 which includes creating a ranked arrangement of the N categories based on relative frequencies of user selections in the recording step 76. This ranked arrangement is the N+1th arrangement (where N arrangements were initially created in the creating step 72). The ranked arrangement may be or may include an ordered arrangement of each of the N categories from most-selected to least-selected, in an embodiment.

The creating step 72, displaying step 74, recording step 76, and second creating step 78 are similar to the steps performed in the method 50 of FIG. 4 which, as noted above, may reduce inherent bias in the initial positioning of the filter categories and thus may determine the most popular filter categories while taking all filter categories into account. The further steps in the method 70, described below, may determine the second, third, and so on most popular filter categories once the most popular category is determined. By repeating the analysis with the most popular category determined, the remaining steps of the method may reduce the likelihood that filters that are partially redundant with the most popular category will also appear at the top of the category rankings, in embodiments.

The method 70 may further include a locking step 80 which includes locking the first (i.e., top) category of the ranked arrangement (created in step 78) into the first position for subsequent arrangements.

The method 70 may further include a third creating step 82 that includes creating a number N−1 of arrangements of a subset of the categories in the ranked arrangement, where the subset includes each category other than the category locked in the first position (i.e., the subset includes a number N−1 of categories, in this example). The third creating step 82 may result in a number N−1 of arrangements of a number N−1 of categories, in which each of the N−1 categories may occupy each position in the arrangement, other than the first position, once.

Figure 6:
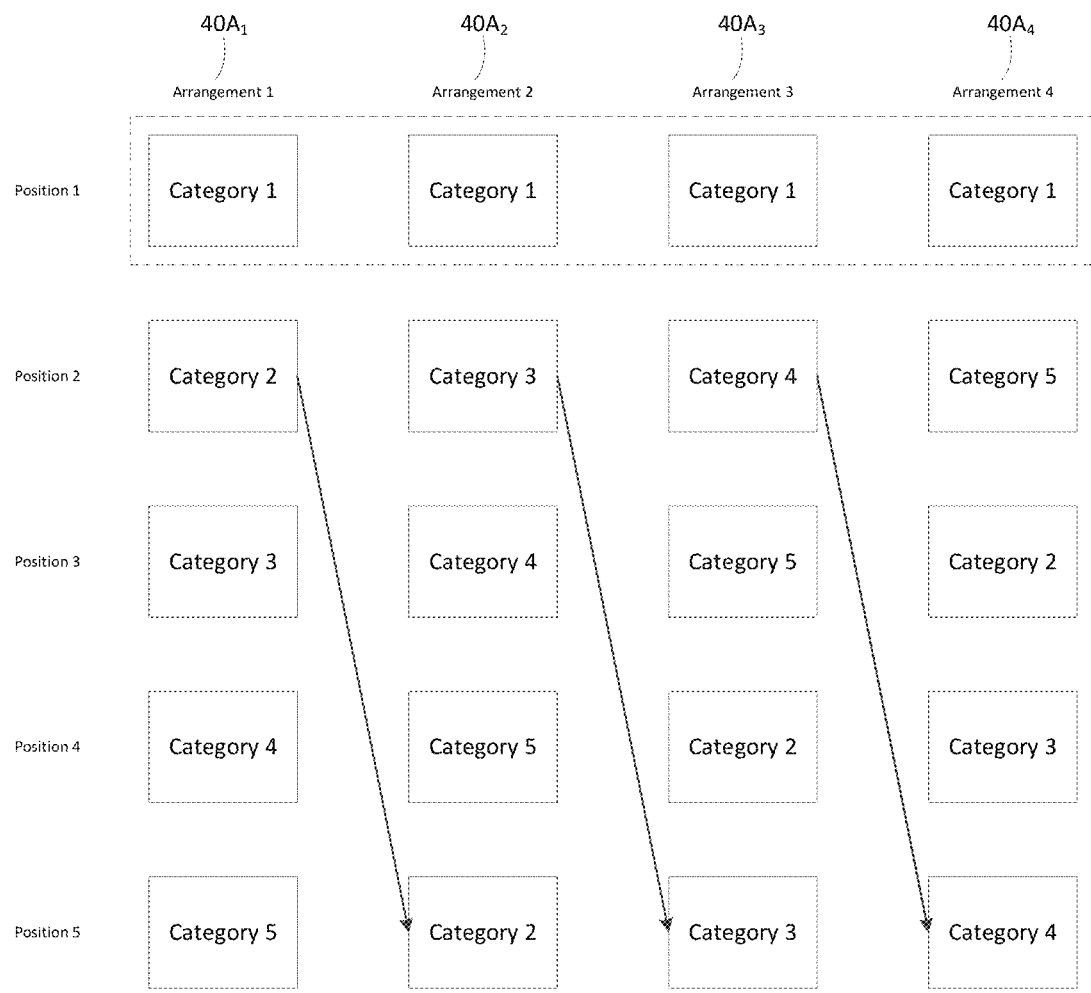
FIG. 6 is a diagrammatic view of an example progression of filter categories according to the method of FIG. 5.

An example progression of the arrangements of the second creating step 82 is illustrated in FIG. 6. In the example of FIG. 6, where N=5, N−1=4 arrangements 40A$_1$, 40A$_2$, 40A$_3$, 40A$_4$ are created (which arrangements may be referred to collectively as arrangements 40A or individually as an arrangement 40A). In an embodiment, as illustrated in FIG. 6, each arrangement 40A may be created based on the previous arrangement, with the category in Position 2 in a given arrangement 40A moved to the last position (i.e., Position 5) in the subsequent arrangement 40A, and each other non-locked category incremented upward. Accordingly, other than the locked first position (i.e., Position 1), the arrangement creation process of FIG. 6 is similar to the arrangement creation process of FIG. 3.

Referring again to FIG. 5, the method 70 may further include a second displaying step 84 that includes displaying the first category of the ranked arrangement and each of the N−1 arrangements—i.e., displaying each of the N−1 arrangements from the creation step 82 with the locked category displayed at the first position—a predetermined or selected number of times. For example, each of the N−1 arrangements may be displayed the predetermined or selected number of times on a webpage as an arrangement of filter categories that may be used to filter a set of items, such as a set of products.

The method may further include a second recording step 86 that includes recording user selections of each of the N−1 categories as the N−1 arrangements are displayed according to the second displaying step 84. Recording the user selections at step 86 may be similar to the first recording step 76. The second recording step 86 may involve receiving user interactions with or selections of each of the categories and storing the records of these interactions or selections. For example, referring to FIG. 6, the recording step 86 may involve recording each instance of a user selecting Category 2, recording each instance of a user selecting Category 3, and so on. After the second recording step 86, the total interactions with each category may have been recorded for each arrangement.

The second displaying and second recording steps 84, 86 may be carried out iteratively, with one of the N−1 arrangements displayed for the predetermined number of times, and user selections recorded for that arrangement, then another of the N arrangements displayed for the predetermined number of times, and user selections recorded for that arrangement, and so on, until every one of the N−1 arrangements has been shown and the user's interactions with the categories in each arrangement has been recorded. By locking the most popular category in the first position while rotating the remaining categories in this iterative process, the user interactions may capture the effect of the most popular category being provided in the first position on the popularity of the subset of remaining categories.

The method 70 may further include a fourth creating step 88 that includes creating a second ranked arrangement based on relative frequency of user selections of the N−1 categories. The second ranked arrangement may be or may include an ordered arrangement of each of the N−1 categories in which the N−1 categories are ordered from most-selected to least-selected, with the locked category at the first position, in an embodiment.

The method may further include a third displaying step 90 that includes displaying the second ranked arrangement. As described with respect to other arrangements in this disclosure, the second ranked arrangement may be displayed in an electronic user interface, such as an electronic user interface of an e-commerce website, for example.

The method 70 of FIG. 5 has been described with respect to an embodiment in which a single category is locked into a first position of the arrangement (i.e., at the locking step 80). In embodiments, more than one category may be locked for subsequent determination of menu category rankings. For example, in an embodiment, following the creation of a second ranked list in the creating step, the first and second categories may be locked into the first and second positions, respectively, and a further set of N−2 arrangements for the remaining N−2 categories may be created and displayed, and user interactions recorded for those arrangements. This process may be repeated as many times as desired—i.e., subsequently locking a third category, then a fourth, etc.

Furthermore, although the method 70 of FIG. 5 has been described with respect to an embodiment in which only a single category is locked at the locking step 80, in other embodiments, more than one category may be locked at a time. For example, in an alternative embodiment, the locking step 80 may include locking the first two categories, and the creating, displaying, and recording steps 82, 84, 86 may occur with respect to N−2 arrangements of the remaining N−2 categories. In another alternative embodiment, the locking step 80 may include locking the first three categories, and the creating, displaying, and recording steps 82, 84, 86 may occur with respect to N−3 arrangements of the remaining N−3 categories, and so on.

In the methods above, the forms in which the various arrangements of categories are displayed have not been specified. One of ordinary skill in the art would appreciate that the arrangement in each of the described methods wherein there is a ranked ordering of most used categories could be used to highlight or reposition categories so as to drive engagement by users by offering the information they are most likely to want more prominently. Further, examples of how categories may be displayed in a user interface will now be described with reference to FIGS. 7 and 8.

Figure 7:
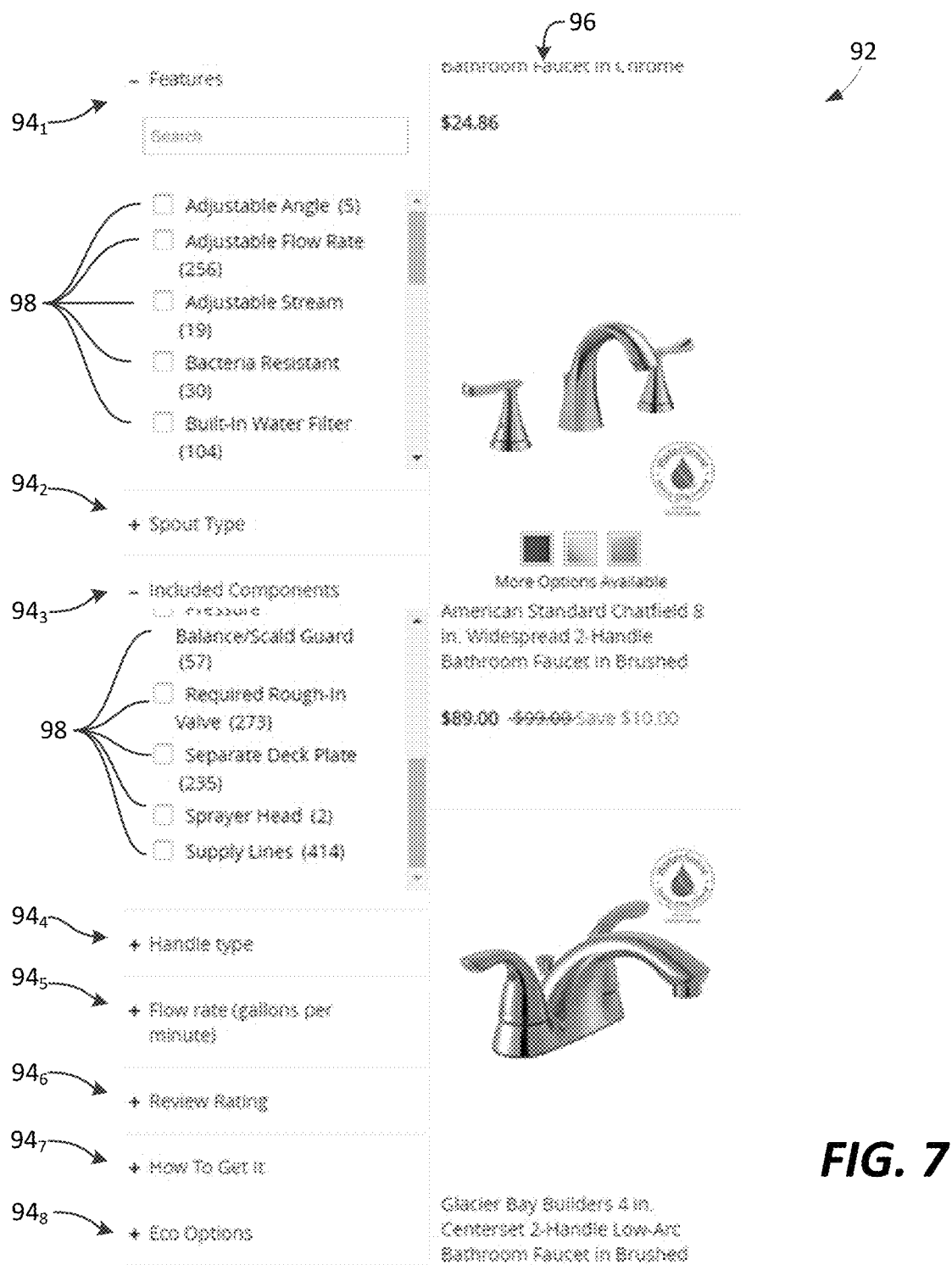
FIG. 7 is an example partial electronic user interface having menu categories that may be arranged according to the methods of this disclosure.

FIG. 7 illustrates an example partial electronic user interface 92 having a plurality of categories $94_1$, $94_2$, $94_3$, ..., $94_8$ (which may be referred to collectively as categories 94 or individually as a category 94) arranged in a left sidebar menu that may be arranged according to the methods of this disclosure. Each category 94 may be associated with one or more options 98. The interface portion 92 further includes a portion 96 in which a plurality of products (e.g., products for sale from a retailer) may be displayed for a user. The products may be associated with various characteristics, may be categorized according to those characteristics, and accordingly may be sorted and/or searched according to the categories 94. In the user interface portion 92 of FIG. 7, a left navigation menu is provided having eight (8) categories 94 of filters that can be used to sort or filter the products displayed. The categories 94 of FIG. 7 ("Features," "Spout Type," Included Components," "Handle type," "Flow rate (gallons per minute)," "Review Rating," "How To Get It," and "Eco Options") are examples only. The categories 94 in the left navigation menu may be sorted and arranged according to the methods of this disclosure. That is, a first arrangement for the categories 94 in the menu may be created and displayed a predetermined number of times, then a second arrangement, and so on. In an embodiment, after each category 94 in the menu has occupied each possible position in the menu, and user selections of the categories 94 in each arrangement have been recorded, a ranked arrangement of the categories 94 may be determined and displayed.

It should be noted that a given menu in a user interface may or may not display, at any given time, all categories 94 or options 98 associated with that menu. For example, in the interface portion 92 of FIG. 7, the eight (8) displayed categories 94 may be eight of ten, fifteen, or more categories 94 associated with that menu, and the menu may include an option to expand or collapse hidden categories. In an embodiment, the methods of this disclosure may account for all categories 94 associated with a menu when creating arrangements and tracking user selections of menus in those arrangements. For example, if the menu of FIG. 7 did have fifteen associated categories 94, fifteen different arrangements may be created and displayed, each a predetermined number of times, with user selections tracked for each arrangement. In the ranked arrangement, the highest-ranked categories may be displayed.

Figure 8:
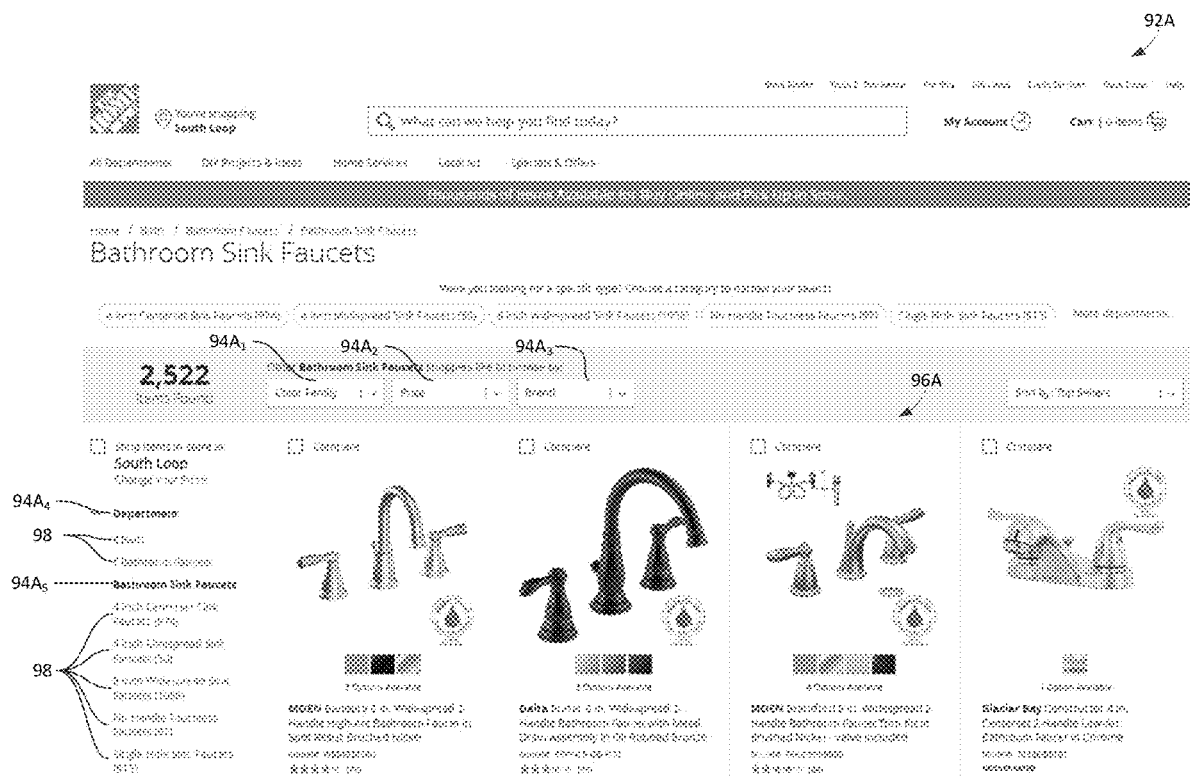
FIG. 8 is an example electronic user interface having menu categories that may be arranged according to the methods of this disclosure.

FIG. 8 illustrates an example electronic user interface portion 92A having a plurality of categories $94A_1$, $94A_2$, $94A_3$, $94A_4$, $94A_5$ arranged in two different menus (with categories 94A1, 94A2, 94A3 in a top navigation menu and categories 94A4, 94A5 in a left sidebar menu) that may be arranged according to the methods of this disclosure. The interface portion 92A also includes a portion 96A in which a plurality of products (e.g., products for sale from a retailer) may be displayed for a user. The products may be associated with various characteristics, may be categorized according to those characteristics, and accordingly may be sorted and/or searched according to categories 94A. In the user interface of FIG. 8, three categories $94A_1$, $94A_2$, $94A_3$ ("Color Family," "Price," and "Brand") are included in a top navigation menu. In one example, these three categories $94A_1$, $94A_2$, $94A_3$ may occupy the first three positions of a ranked arrangement of categories for the displayed products that was created according to the methods of this disclosure.

As noted above, the methods of the instant disclosure may be applied to determine an order of popularity of menu categories that reduces or eliminates bias caused by the initial positioning of those categories. Another example use of the methods of this disclosure is to determine an order of popularity of menu categories when adding a new category. Because the popularity and bias effect of the new category may not be known ahead of time, the methods of this disclosure can be used to determine a proper position for the new category in the ranked arrangement of menu categories based on user interaction and engagement. In another example, the methods of this disclosure may find use when existing categories are applied to a new set of products or when the items (e.g., filters) within a category are reordered or changed. The methods of this disclosure may also be applied to determine a proper ranked arrangement of menu categories to correct for any changes to the interface that may influence user engagement of those filters.

Figure 9:
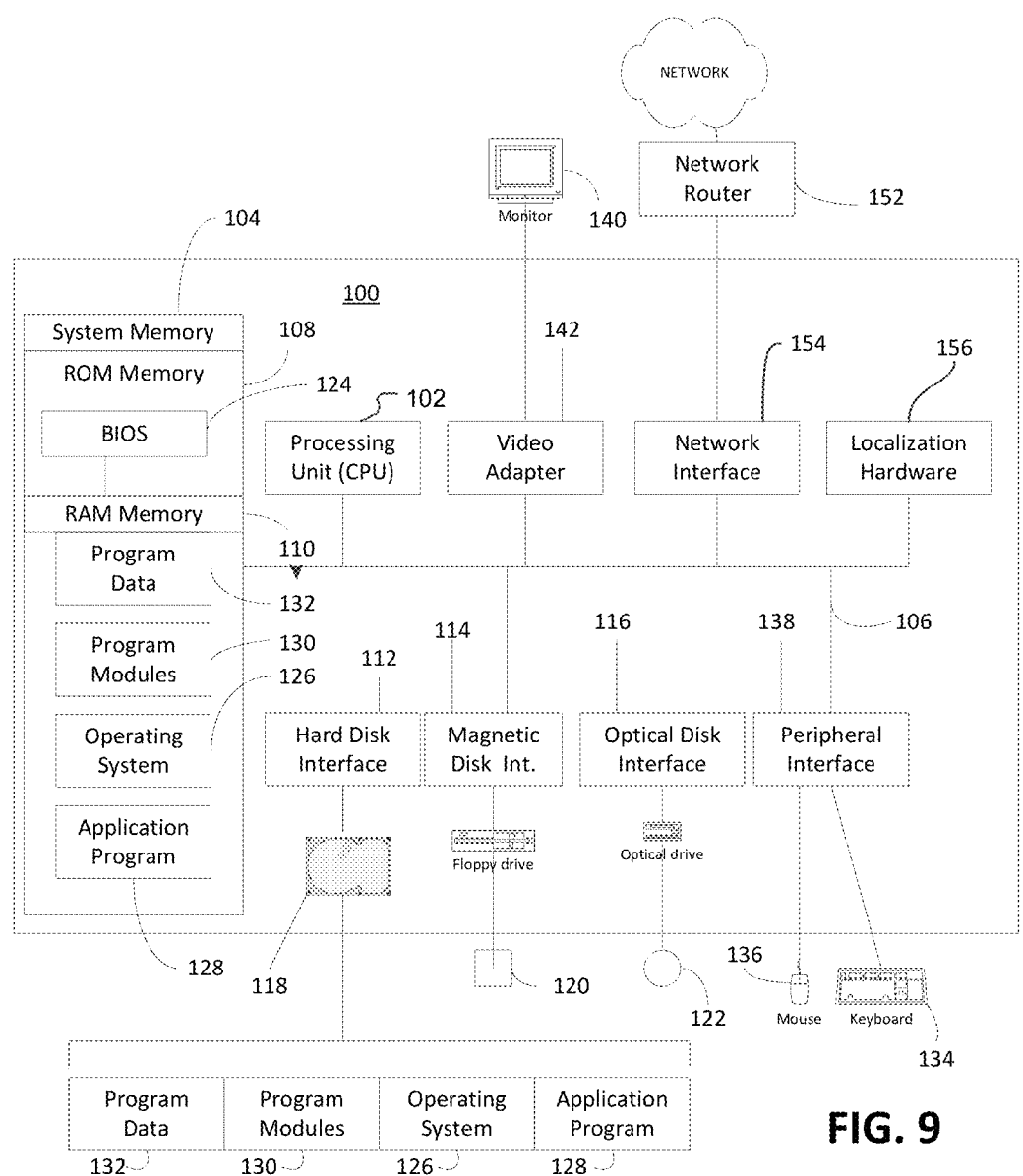
FIG. 9 is a diagrammatic view of a user computing environment according to some embodiments.

FIG. 9 is a diagrammatic view of an illustrative computing system that includes a general purpose computing system environment 100, such as a desktop computer, laptop, smartphone, tablet, or any other such device having the ability to execute instructions, such as those stored within a non-transient, computer-readable medium. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, the computer readable memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 106, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 130, hard drive 118, and/or peripheral memory devices may be used to store computer executable instructions comprising an operating system 126, one or more applications programs 128 (such as a Web browser, retailer's mobile app, retailer's point-of-sale checkout and ordering program, and/or other applications that execute the methods and processes of this disclosure), other program modules 130, and/or program data 132. Still further, computer-executable instructions may be downloaded to the computing environment 100 as needed, for example, via a network connection.

An end-user, e.g., a customer, retail associate, and the like, may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 122. In addition to the monitor 120, the computing system environment 120 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 132, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 156 for determining a location of the computing system environment 100. In embodiments, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method for displaying a user interface, the user interface comprising a menu and the menu comprising a plurality of categories, the method comprising:

creating, by a processor, a first arrangement for the plurality of categories within the menu, the first arrangement comprising a first ordered list of the plurality of categories;

causing, by the processor, the user interface to display the first arrangement for the plurality of categories to one or more users a number of times;

automatically creating, by the processor, a second arrangement for the plurality of categories within the menu, the second arrangement comprising a second ordered list of the plurality of categories that comprises a different order of the plurality of categories than the first ordered list;

responsive to the first arrangement having been displayed the number of times, causing, by the processor, the user interface to display the second arrangement for the plurality of categories to one or more users the number of times;

recording user selections of the plurality of categories through the user interface in both the first arrangement and the second arrangement;

responsive to the first arrangement having been displayed to one or more users the number of times and the second arrangement having been displayed to one or more users the number of times, creating, by the processor, a third arrangement for the plurality of categories within the menu, the third arrangement comprising a third ordered list of the plurality of categories, the order of the third ordered list determined according to relative frequencies of user selections of the plurality of categories in the recorded user selections; and causing, by the processor, the user interface to display the third arrangement for the plurality of categories;

wherein the plurality of categories consists of a number N of categories, the method further comprising:

automatically creating, by the processor, N different arrangements for the plurality of categories within the menu;

causing, by the processor, the user interface to display each given one of the N different arrangements to one or more users the number of times;

recording user selections of the plurality of categories through the user interface in the N arrangements;

after causing the user interface to display each given one of the N different arrangements to one or more users the number of times, creating, by the processor, an N+1 arrangement for the plurality of categories within the menu according to relative frequencies of user selections of the plurality of categories in the recorded user selections; and causing, by the processor, the user interface to display the N+1 arrangement.

2. The method of claim 1, wherein each arrangement comprises a first position, a last position, and ordered intermediate positions between the first position and the last position, wherein creating the second arrangement comprises:

placing the category in the first position in the first arrangement in the last position in the second arrangement; and incrementing each other category up one position from the first arrangement to the second arrangement.

3. The method of claim 1, wherein each arrangement comprises a first position, a last position, and ordered intermediate positions between the first position and the last position;

wherein each category in the plurality of categories occupies each of the first position, last position, and each of the ordered intermediate positions once among the N arrangements.

4. The method of claim 1, further comprising:

locking a first category of the plurality of categories in a first position, wherein the first category had the highest relative frequency of user selections of the plurality of categories in the recorded user selections for the N arrangements;

automatically creating, by the processor, N−1 arrangements of a first subset of the plurality of categories wherein the subset of the plurality of categories includes all of the categories except the first category;

causing, by the processor, the user interface to display the first category in the first position with each of the N−1 arrangements to one or more users the number of times;

recording user selections of the first subset of the plurality of categories through the user interface in each of the N−1 arrangements;

after causing the user interface to display the first category in the first position with each of the N−1 arrangements to one or more users the number of times, creating, by the processor, a first ranked arrangement for the first subset of the plurality of categories within the menu according to relative frequencies of user selections of the plurality of categories in the recorded user selections; and causing, by the processor, the user interface to display the first category in the first position and the first ranked arrangement for the first subset of the plurality of categories in the remaining positions.

5. The method of claim 4, further comprising:

locking a second category of the plurality of categories into a second position, wherein the second category had the highest relative frequency of user selections of the plurality of categories in the recorded user selections for the N−1 arrangements;

creating, by the processor, N−2 arrangements of a second subset of the plurality of categories wherein the subset of the plurality of categories includes all of the categories except the first and the second category;

causing, by the processor, the user interface to display the first category in the first position and the second category in the second position with each of N−2 arrangements of a second subset of the plurality of categories to one or more users the number of times;

recording user selections of the second subset of the plurality of categories through the user interface in each of the N−2 arrangements;

after causing the user interface to display the first category in the first position and the second category in the second position with each of N−2 arrangements of a second subset of the plurality of categories to one or more users the number of times, creating, by the processor, a second ranked arrangement for the second subset of the plurality of categories within the menu according to relative frequencies of user selections of the plurality of categories in the recorded user selections; and causing, by the processor, the user interface to display the first category in the first position, the second category in the second position, and the second ranked arrangement for the second subset of the plurality of categories.

6. The method of claim 1, wherein the plurality of categories are categories of filters, the method further comprising:

presenting a set of items in the interface according to user engagement of the filters.

7. The method of claim 1, wherein each of the plurality of categories includes at least two respective user options.

8. The system of claim 1, wherein causing the user interface to display the first arrangement and causing the user interface to display the second arrangement both comprise providing a website or mobile application containing the user interface to a user device.

9. A system for displaying a user interface, the user interface comprising a menu, the menu comprising a plurality of categories, the system comprising:
a computer-readable memory storing instructions; and
a processor configured to execute the instructions to:
create a first arrangement for the plurality of categories within the menu, the first arrangement comprising a first ordered list of the plurality of categories;
cause the user interface to display the first arrangement for the plurality of categories to one or more users a number of times;
automatically create a second arrangement for the plurality of categories within the menu, the second arrangement comprising a second ordered list of the plurality of categories that comprises a different order of the plurality of categories than the first ordered list;
responsive to the first arrangement having been displayed the number of times, cause the user interface to display the second arrangement to one or more users the number of times;
record user selections of the plurality of categories through the user interface in both the first arrangement and the second arrangement;
responsive to the first arrangement having been displayed to one or more users the number of times and the second arrangement having been displayed to one or more users the number of times, create a third arrangement for the plurality of categories within the menu, the third arrangement comprising a third ordered list of the plurality of categories, the order of the third ordered list determined according to relative frequencies of user selections of the plurality of categories in the recorded user selections; and
cause the user interface to display the third arrangement;
wherein the plurality of categories consists of a number N of categories, wherein the processor is configured to execute the instructions further to:
automatically create N different arrangements for the plurality of categories within the menu;
cause the user interface to display each given one of the N arrangements to one or more users the number of times;
record user selections of the plurality of categories through the user interface in the N arrangements;
after cause the user interface to display each given one of the N arrangements to one or more users the number of times, create an N+1 arrangement for the plurality of categories within the menu according to relative frequencies of user selections of the plurality of categories in the recorded user selections; and
cause the user interface to display the N+1 arrangement.

10. The system of claim 9, wherein each arrangement comprises a first position, a last position, and ordered intermediate positions between the first position and the last position, wherein creating the second arrangement comprises:
placing the category in the first position in the first arrangement in the last position in the second arrangement; and
incrementing each other category up one position from the first arrangement to the second arrangement.

11. The system of claim 9, wherein each arrangement comprises a first position, a last position, and ordered intermediate positions between the first position and the last position;
wherein each category in the plurality of categories occupies each of the first position, last position, and each of the ordered intermediate positions once among the N arrangements.

12. The system of claim 9, the processor further configured to execute the instructions to:
lock a first category in a first position, wherein the first category had the highest relative frequency of user selections of the plurality of categories in the recorded user selections for the N arrangements;
automatically create N−1 arrangements of a first subset of the plurality of categories wherein the subset of the plurality of categories includes all of the categories except the first category;
cause the user interface to display the first category in the first position with each of the N−1 arrangements to one or more users the number of times;
record user selections of the first subset of the plurality of categories through the user interface in each of the N−1 arrangements;
after causing the user interface to display the first category in the first position with each of the N−1 arrangements to one or more users the number of times, create a first ranked arrangement for the first subset of the plurality of categories within the menu according to relative frequencies of user selections of the plurality of categories in the recorded user selections; and
cause the user interface to display the first ranked arrangement.

13. The system of claim 12, the processor further configured to execute the instructions to:
lock a second category into a second position, wherein the second category had the highest relative frequency of user selections of the plurality of categories in the recorded user selections for the N−1 arrangements;
automatically create N−2 arrangements of a second subset of the plurality of categories wherein the subset of the plurality of categories includes all of the categories except the first and the second category;
cause the user interface to display the first category in the first position and the second category in the second position with each of the N−2 arrangements of a second subset of the plurality of categories to one or more users the number of times;
record user selections of the second subset of the plurality of categories through the user interface in each of the N−2 arrangements;
after causing the user interface to display the first category in the first position and the second category in the second position with each of the N−2 arrangements of a second subset of the plurality of categories to one or more users the number of times, create a second ranked arrangement for the second subset of the plurality of categories within the menu according to relative frequencies of user selections of the plurality of categories in the recorded user selections; and
cause the user interface to display the first category in the first position, the second category in the second position, and the second ranked arrangement.

14. The system of claim 9, wherein the plurality of categories are categories of filters, wherein the processor is configured to execute the instructions further to present a set of items in the interface according to user engagement of the filters.

15. The system of claim 9, wherein each of the plurality of categories includes at least two respective options.

16. The system of claim 9, wherein the server causes both the user interface to display the first arrangement and causes the user interface to display the second arrangement by providing a website containing the user interface to a user device.

17. A computer-implemented method for displaying a user interface, the user interface comprising a menu and the menu comprising a plurality of categories, the method comprising:

creating, by a processor, N different arrangements for a plurality of categories within the menu wherein each arrangement comprises a first position, a last position, and ordered intermediate positions between the first position and the last position;

wherein each category in the plurality of categories occupies each of the first position, last position, and each of the ordered intermediate positions once among the N arrangements;

iteratively: (i) causing, by the processor, the user interface to display each given one of the N arrangements to one or more users a number of times; and (ii) recording user selections of the plurality of categories through the user interface in the N arrangements on the computer-readable memory;

automatically creating, by the processor, an N+1 arrangement for the plurality of categories within the menu according to relative frequencies of user selections of the plurality of categories in the recorded user selections; and causing, by the processor, the user interface to display the N+1 arrangement.

18. The method of claim 17, further comprising:

locking a first category in a first position, wherein the first category had the highest relative frequency of user selections of the plurality of categories in the recorded user selections in the N arrangements;

automatically creating, by the processor, N−1 arrangements of a first subset of the plurality of categories wherein the subset of the plurality of categories includes all of the categories except the first category;

causing, by the processor, the user interface to display the first category in the first position with each of N−1 arrangements to one or more users the number of times with the plurality of categories arranged in the given arrangement;

automatically creating, by the processor, a first ranked arrangement for the first subset of the plurality of categories within the menu according to relative frequencies of user selections of the plurality of categories in the recorded user selections; and causing, by the processor, the user interface to display the first category in a first position and the first ranked arrangement for the first subset of the plurality of categories in the remaining positions.

* * * * *